United States Patent Office 3,600,347
Patented Aug. 17, 1971

3,600,347
HOT MELT ADHESIVE FOR POLYETHYLENE
Joseph Lambert Godar, Jr., Wauconda, Ill., assignor to American Can Company, New York, N.Y.
No Drawing. Filed Dec. 23, 1968, Ser. No. 786,477
Int. Cl. C09j 3/26
U.S. Cl. 260—27                                    10 Claims

ABSTRACT OF THE DISCLOSURE

A hot melt adhesive composition for polyethylene containing a homogeneous mixture of different copolymers of ethylene and vinyl acetate, atactic polypropylene, and plural tackifying resins.

BACKGROUND OF THE INVENTION

This invention relates to the composition of a hot melt adhesive which is particularly suitable for bonding polyethylene to polyethylene as well as to other substrates, such as paper, plastic, cellophane, textiles and wood.

A hot melt adhesive forms a bond in a substrate by cooling and solidifying rather than by means of a chemical reaction such as cross linking. For this reason, a hot melt adhesive can be reheated and remelted to destroy the adhesive bond, i.e. the adhesive is thermoplastic rather than thermosetting. Before it is melted, a hot melt adhesive is a solid which can be easily handled in bulk or pellet form. Upon heating, however, such an adhesive fluidizes over its softening range and flows for application either between substrates or upon one substrate at a time, with subsequent remelting possible to form a hot melt bond with another substrate. In either of these cases, the hot melt adhesive forms a quick wetting, pressure-sensitive bond between the substrates within its fluid range.

However, previously known formulations for hot melt adhesives suffered from several infirmities. The bonds obtainable from such formulations were not able to withstand large variations in temperature. The adhesive bonds tended to become excessively brittle at low temperature, and thereby, the bonds were susceptible to failure under mechanical shock, and the bonds tended to become excessively weak at elevated temperatures of the adhesive, and thereby, the bonds were susceptible to failure from the strains placed thereon. Also, it was found that at any temperature, because of the inherent difficulty in obtaining adherence to polyethylene, a hot melt adhesive bond to a substrate of polyethylene tended to be weaker than a bond obtainable to other substrates. In addition, it was found that the presence of foreign substrates from certain process machinery on a polyethylene substrate tended to further weaken the hot melt adhesive bond in the substrate. In the manufacture of the seam release container, described in U.S. Pat. Nos. 3,330,436 and 3,366,269, a good hot melt adhesive bond was needed between a polyethylene strip and an overlapping polyethylene tab. It was found that when previously known formulations of adhesives were used on the polyethylene strip and after the containers were subjected to the extremes of process temperatures, which varied between 0° and 120° F., the adhesive bond tended to fail for some or all of the aforementioned reasons.

SUMMARY OF THE INVENTION

In order to overcome the infirmities in previous formulations for hot melt adhesives, as indicated in the Background of the Invention, this invention provides a hot melt adhesive composition comprising a substantially homogeneous mixture of:

17 to 38 weight percent ethylene-vinyl acetate copolymer resin, containing about 40 weight percent polymerized vinyl acetate;

3 to 24 weight percent ethylene-vinyl acetate copolymer resin, containing about 18 weight percent polymerized vinyl acetate;

1 to 30 weight percent atactic polypropylene having a molecular weight of 15,000 to 20,000.

3 to 14 weight percent of a normally liquid tackifying resin; and 26 to 47 weight percent of a polyterpene resin having a molecular weight of about 1200.

DESCRIPTION OF THE PREFERRED EMBODIMENT

As a preferred or exemplary embodiment, this invention relates to a hot melt adhesive consisting of a substantially homogeneous mixture of atactic polypropylene, polyterpene resin, copolymer of ethylene-vinyl acetate having a polymerized vinyl acetate content of about 40% (hereinafter referred to as Evac 40), copolymer of ethylene-vinyl acetate having a polymerized vinyl acetate content of about 18% (hereinafter referred to as Evac 18), and chlorinated biphenyl.

The atactic (amorphous) polypropylene of the instant invention is made by the stereospecific polymerization of polypropylene. Polymerization occurs in the presence of a catalyst comprising a coordination complex of a transition metal halide with an organometallic compound. The resulting atactic polypropylene usually represents from about 5 to 15 weight percent of the polymerization product, the remainer being isotatic (crystalline) polypropylene. The solid atactic polypropylene, suitable for the composition of this invention, has a molecular weight of 15,000 to 60,000 and more particularly from 16,000 to 20,000. It is soluble in boiling pentane, hexane, heptane and other hydrocarbons.

In a well known process for separating the atactic from the isotatic polypropylene, the polymerization product, in the reaction medium containing heptane, is contacted with a solvent consisting of methanol and water to kill the catalyst. The catalyst is then removed in solution leaving a heptane slurry. The atactic polypropylene is dissolved in the heptane and can be separated from the isotactic polymer which is less soluble in heptane. The heptane solution is distilled to recover the atactic polypropylene, and the heptane solvent can then be recycled. The solid material which remains is the atactic polypropylene employed in the compositions of the invention.

Suitable atactic polypropylene is also available commercially, such as "Oletac 100."

TABLE 1.—PROPERTIES OF ATACTIC POLYPROPYLENE "OLETAC 100" EMPLOYED

| | |
|---|---|
| Molecular wt. | 16,000 to 20,000 |
| Viscosity, cp. at 300° F. | 4,200 to 5,800 |
| Ring and ball, ° C. | 115 to 121 |
| Intrinsic viscosity (Ω) | .28 |

In a well known procedure for producing polyterpene resins, pinene is diluted with a refined hydrocarbon solvent, such as a naphtha cut, and contacted with a Friedel-Crafts catalyst. After the initial exothermic reactions have subsided, an additional contacting period with the catalyst is provided. The catalyst is then removed by successive washings with water and dilute aqueous alkali, and the resultant aqueous and hydrocarbon phases are separated. The hydrocarbon phase containing the polyterpenes is then steam distilled. A polyterpene resin composed of both alpha- and beta-pinene resins remains in the stillpot.

The polyterpene resin suitable for the compositions of the instant ivention contains fractions of both alpha- and beta-pinene resins. "Nirez 1135" is a suitable polyterpene resin that is available commercially.

TABLE 2.—PROPERTIES OF POLYTERPENE RESIN "NIREZ 1135" EMPLOYED

Molecular weight—about 1,200
Melt point—135° C.
Acid No.—0
Density at 25/25° C.—.995

The copolymers of ethylene and vinyl acetate suitable for use in this invention can be prepared by methods well known in the art. See, for example, the procedures described in U.S. Patent 2,200,429 or 2,703,794.

Generally, their preparation involves copolymerizing a mixture of ethylene and vinyl acetate by means of a free-radical producing catalyst, such as oxygen or an organic peroxide, at a pressure of 100 to 200 atmospheres and at a temperature in the range of 150° to 250° C. and then recovering the product.

In addition to the two-component ethylene-vinyl acetate copolymers, copolymers of ethylene and vinyl acetate containing small amounts, on the order of .001 to 3% by weight, of a third or fourth comonomer are also suitable for use in the compositions of this invention. Thus, copolymers with small amounts of adhesion-promoting monomers such as acrylic acid, methacrylic acid, itaconic acid, acrylamide, B-dimethylaminoethyl methacrylate, B-hydroxyethyl acrylate and other monomers having carboxyl, amido, amino or hydroxyl groups could be used in this invention. The copolymer might also contain a poly-unsaturated monomer, such as diallyl maleate, diallyl phthalate, diallyl ether, ethylene glycol dimethacrylate, etc., which in small amounts can be used to give a controlled amount of cross-linking and thus lower the melt index without leading to insolubilization of the copolymer.

Two ethylene-vinyl acetate copolymers, Evac 40 and Evac 18, are mixed in the composition of this invention. Evac 40 has a combined vinyl acetate content of 30 to 50 weight percent with a corresponding melt index of 30 to 100, and Evac 18 has a combined vinyl acetate content of 14 to 25 weight percent and a melt index of 1 to 6. No individual copolymer of ethylene-vinyl acetate has been found to have properties equivalent to this combination of a relatively high weight percent and high melt index copolymer and of a relatively low weight percent and low melt index copolymer. In the preferred hot melt composition of this invention, the two copolymers contain about 18% and about 40% by weight polymerized vinyl acetate.

A suitable Evac 18 is available commercially, such as "Elvax 460."

TABLE 3.—PROPERTIES OF "ELVAX 460" EMPLOYED

| | |
|---|---|
| Melt index | 2.1–2.9 |
| Ring and ball, ° F. | 390 |
| Weight percent combined vinyl acetate | 18 |

A suitable Evac 40 copolymer is available commercially, such as "Elvax 40."

TABLE 4.—PROPERTIES OF "ELVAX 40" EMPLOYED

| | |
|---|---|
| Melt index | 45–65 |
| Ring and ball, ° F. | 200 |
| Weight percent vinyl acetate | 40 |

Chlorinated biphenyls which are the normally liquid tackifying resin preferred for use in the invention contain about 62% by weight of chemically combined chlorine. These resins may be characterized as clear, soft, sticky, viscous liquids at room temperature capable of providing good tack while in the liquid state. A suitable chlorinated biphenyl is available commercially, such as "Aroclor 1262."

TABLE 5.—PROPERTIES OF "AROCLOR 1262" EMPLOYED

Percent chlorine—61.5—62.5

Of course, equivalent soft, sticky, viscous liquids such as "Abitol," a mixture of tetra-, di-, and dehydroabietyl alcohols made from rosin, having a specific gravity (20/20° C.) of 1.007, a refractive index (20° C.) of 1.528 and a viscosity (200° C.) of 30 poises will also be suitable in the composition of this invention.

The hot melt adhesive of this invention is prepared by mixing the five aforementioned ingredients at the lowest temperature that will result in sufficient softening of all the ingredients. This prevents unnecessary oxidation of the compositions and is also most economical. 350° F. is the preferred temperature for mixing.

Mixing may be carried out in any suitable manner. Satisfactory mixing can be easily accomplished in a heated Sigma Blade mixer. The ingredients should be permitted to stand in the mixer until softened, and then, they are mixed until the adhesive composition is substantially homogeneous. The mixture is then applied to the selected substrate at a temperature at which the viscosity of the mixture is suitably low for the manner of application selected. The preferred application temperature is about 400° F.

The preferred formulation of the hot melt adhesive of this invention has been found to be: 27.8 weight percent Evac 40; 13.9% Evac 18; 13.9% atactic polypropylene; 8.3% chlorinated biphenyl and 36.1% polyterpene resin. When this formulation was applied between substrates of polyethylene at 400° F., the strength of the resulting adhesive bonds was determined to be about 10 pounds/linear inch. This bond strength was sufficient to hold the polyethylene to the polyethylene strip during subsequent processing and handling of the container. In addition, this adhesive composition had a sufficiently low viscosity and sufficient adhesion for proper flow onto the substrate at 400° F.

In the instant invention, the Evac 40 tends to make the adhesive bond with polyethylene stronger at low temperatures and to make the melted adhesive less viscous. The Evac 18, on the other hand, tends to make the adhesive bond with polyethylene less brittle at low temperatures and to make the adhesive stronger at elevated temperatures. The chlorinated biphenyl gives good tack at low temperatures. The polyterpene resin gives low viscosity and good tack to the substrate at the melt temperature of the composition of the invention as well as at lower temperatures. The atactic polypropylene gives good tack to the mixture between 0° and 115° F. and importantly is believed to prevent the ingredients from physically bonding with each other, thereby maintaining a physical separation of the ingredients in the mixed adhesive composition of this invention.

As an example of the effect of the atactic polypropylene in maintaining the integrity of the ingredient in the adhesive composition it was hereinbefore stated that the combination of two copolymers of ethylene-vinyl acetate had been found to be superior to any single colymer theref. This superiority was due, it is believed, to the fact that the characteristics of the copolymer were combining, rather than the copolymers themselves combining to yield new characteristics in the composition of this invention. In one case, Elvax 150, having a polymerized vinyl acetate content of 32%, equivalent to the polymerized vinyl acetate content of the Elvax 40 and the Elvax 460 in the preferred composition, was found to yield a hot melt adhesive that was unsatisfactory at low temperatures when substituted for the Elvax 40 and the Elvax 460 in the preferred composition.

It is thought that the invention and many of its attendant advantages will be understood from the foregoing description and it will be apparent that various changes may be made in the matter of the ingredients, their iden-

I claim:

1. A hot melt adhesive composition, comprising a substantially homogeneous mixture of:
   17 to 38 weight percent of a first copolymer of ethylene and vinyl acetate having a melt index of 30 to 100 and containing 30 to 50 weight percent polymerized vinyl acetate;
   3 to 24 weight percent of a second copolymer of ethylene and vinyl acetate having a melt index of 1 to 6 and containing 14 to 25 weight percent polymerized vinyl acetate;
   1 to 30 weight percent of an atactic polypropylene having a molecular weight of 15,000 to 20,000;
   3 to 14 weight percent of a normally liquid tackifying resin selected from the group consisting of chlorinated biphenyls and abietyl alcohols; and
   26 to 46 weight percent of a polyterpene resin having a molecular weight of about 1200 and containing both alpha and beta pinenes.

2. The hot melt adhesive of claim 1 wherein said first copolymer has a melt index of 45 to 65 and contains about 40 weight percent polymerized vinyl acetate.

3. The hot melt adhesive of claim 1 wherein said second copolymer has a melt index of 2.1 to 2.9 and contains about 18 weight percent polymerized vinyl acetate.

4. The hot melt adhesive of claim 1 containing 27.8 weight percent of said first copolymer.

5. The hot melt adhesive of claim 1 containing 13.9 weight percent of said second copolymer.

6. The hot melt adhesive of claim 1 containing 13.9 weight percent of said atactic polypropylene.

7. The hot melt adhesive of claim 1 wherein said tackifying resin is a chlorinated biphenyl containing about 62 percent combined chlorine.

8. The adhesive of claim 1 containing 8.3 weight percent of said chlorinated biphenyl.

9. The hot melt adhesive of claim 1 containing 36.1 weight percent of said polyterpene resin.

10. The hot melt adhesive of claim 1 containing about 28 weight percent of said first copolymer, about 14 weight percent of said second copolymer, about 14 weight percent of said atactic polypropylene, about 8 percent of said normally liquid tackifying resin, and about 36 percent of said polyterpene resin.

References Cited

UNITED STATES PATENTS

| | | | |
|---|---|---|---|
| 3,175,986 | 3/1965 | Apikos et al. | 260—27 |
| 3,232,895 | 2/1966 | Klein et al. | 260—27 |
| 3,256,228 | 6/1966 | Tyran | 260—27 |
| 3,356,766 | 12/1967 | Ware | 260—897 |
| 3,360,488 | 12/1967 | Hall et al. | 260—23 |
| 3,386,936 | 6/1968 | Gordy et al. | 260—27 |

DONALD E. CZAJA, Primary Examiner

W. E. PARKER, Assistant Examiner

U.S. Cl. X.R.

161—247; 260—33.8, 876, 897